(12) United States Patent
Lahner et al.

(10) Patent No.: US 10,180,219 B1
(45) Date of Patent: Jan. 15, 2019

(54) LIGHTING FIXTURE

(71) Applicant: Electrix, LLC, New Haven, CT (US)

(72) Inventors: Mark E. Lahner, Guilford, CT (US); Armando A. Abrina, New Haven, CT (US)

(73) Assignee: Electrix, LLC, New Haven, CT (US)

( * ) Notice: Subject to any disclaimer, the term of this patent is extended or adjusted under 35 U.S.C. 154(b) by 463 days.

(21) Appl. No.: 14/971,151

(22) Filed: Dec. 16, 2015

Related U.S. Application Data

(60) Provisional application No. 62/092,372, filed on Dec. 16, 2014.

(51) Int. Cl.
| | |
|---|---|
| *F21S 8/00* | (2006.01) |
| *F21V 21/02* | (2006.01) |
| *F21V 33/00* | (2006.01) |
| *F21Y 103/00* | (2016.01) |

(52) U.S. Cl.
CPC .............. *F21S 8/033* (2013.01); *F21V 21/02* (2013.01); *F21V 33/006* (2013.01); *F21Y 2103/003* (2013.01)

(58) Field of Classification Search
CPC ........ F21S 8/033; F21V 21/02; F21V 33/006; F21V 21/00; F21V 21/025; F21V 19/00; F21V 15/01; F21V 15/013; F21V 17/12; F21V 17/10; F21V 17/16; F21Y 2103/003
See application file for complete search history.

(56) References Cited

U.S. PATENT DOCUMENTS

| | | | |
|---|---|---|---|
| 4,881,156 A | 11/1989 | Shemitz et al. | |
| 5,550,725 A | 8/1996 | Shemitz et al. | |
| 5,713,657 A * | 2/1998 | Dearborn ................. | A47H 2/00 362/147 |
| 7,249,870 B1 | 7/2007 | Shwisha | |
| 7,658,518 B2 | 2/2010 | Shwisha | |
| 9,062,840 B2 | 6/2015 | Swisha et al. | |

* cited by examiner

*Primary Examiner* — Bao Q Truong
(74) *Attorney, Agent, or Firm* — Bachman & LaPointe, P.C.

(57) ABSTRACT

A light apparatus is mounted to a surface of a building and comprises: at least one elongate mounting member engaged to the surface; spaced-apart brackets mounted to the at least one elongate mounting member and extending forward therefrom; at least one light source mounted to a plurality of the spaced apart brackets; a forward trim mounted to the spaced-apart brackets; a lower trim mounted to the spaced-apart brackets; and a passageway. The passageway passes at least one of: a fluid line; an optical fiber; a communications line; and a power line not powering the at least one light source.

20 Claims, 5 Drawing Sheets

LIGHTING FIXTURE

CROSS-REFERENCE TO RELATED APPLICATION

Benefit is claimed of U.S. Patent Application No. 62/092,372, filed Dec. 16, 2015, and entitled "Lighting Fixture", the disclosure of which is incorporated by reference herein in its entirety as if set forth at length.

BACKGROUND OF THE INVENTION

The invention relates to electric lighting. More particularly, the invention relates to light fixtures for indirect lighting.

Well-developed fields exist in indirect lighting and architectural lighting fixtures. A particular area of indirect lighting is known as cove lighting. In a typical cove lighting situation, an upwardly open channel structure is built along a wall near the ceiling. The wall may be a side wall of the room, a sidewall of a recess in the ceiling, a side surface of a beam, or the like. Light bulbs are mounted within the channels so that the emitted light escapes generally upward to directly light the wall and ceiling above and, indirectly, an interior of the room and its contents. The channels are built with conventional building techniques involving framing, wallboarding/plastering, and the like.

Alternatives involve elongate fixtures used for cove lighting. Such fixtures typically include an elongate bulb within an elongate reflector positioned so that light from the bulb and reflector does not directly pass to objects within a room but, rather, is first diffusely reflected from a ceiling, wall, or other architectural feature. Such fixtures may be assembled end-to-end in lieu of placing fixtures within a preexisting channel. Exemplary systems are shown in U.S. Pat. Nos. 4,881,156, 5,550,725, 7,249,870 and 7,658,518.

SUMMARY OF THE INVENTION

One aspect of the disclosure involves a light apparatus mounted to a surface of a building and comprising: at least one elongate mounting member engaged to the surface; spaced-apart brackets mounted to the at least one elongate mounting member and extending forward therefrom; at least one light source mounted to a plurality of the spaced apart brackets; a forward trim mounted to the spaced-apart brackets; a lower trim mounted to the spaced-apart brackets; and a passageway. The passageway passes at least one of: a fluid line; an optical fiber; a communications line; and a power line not powering the at least one light source.

Other aspects involve a kit for forming such an apparatus.

Other aspects involve a method for forming such an apparatus.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
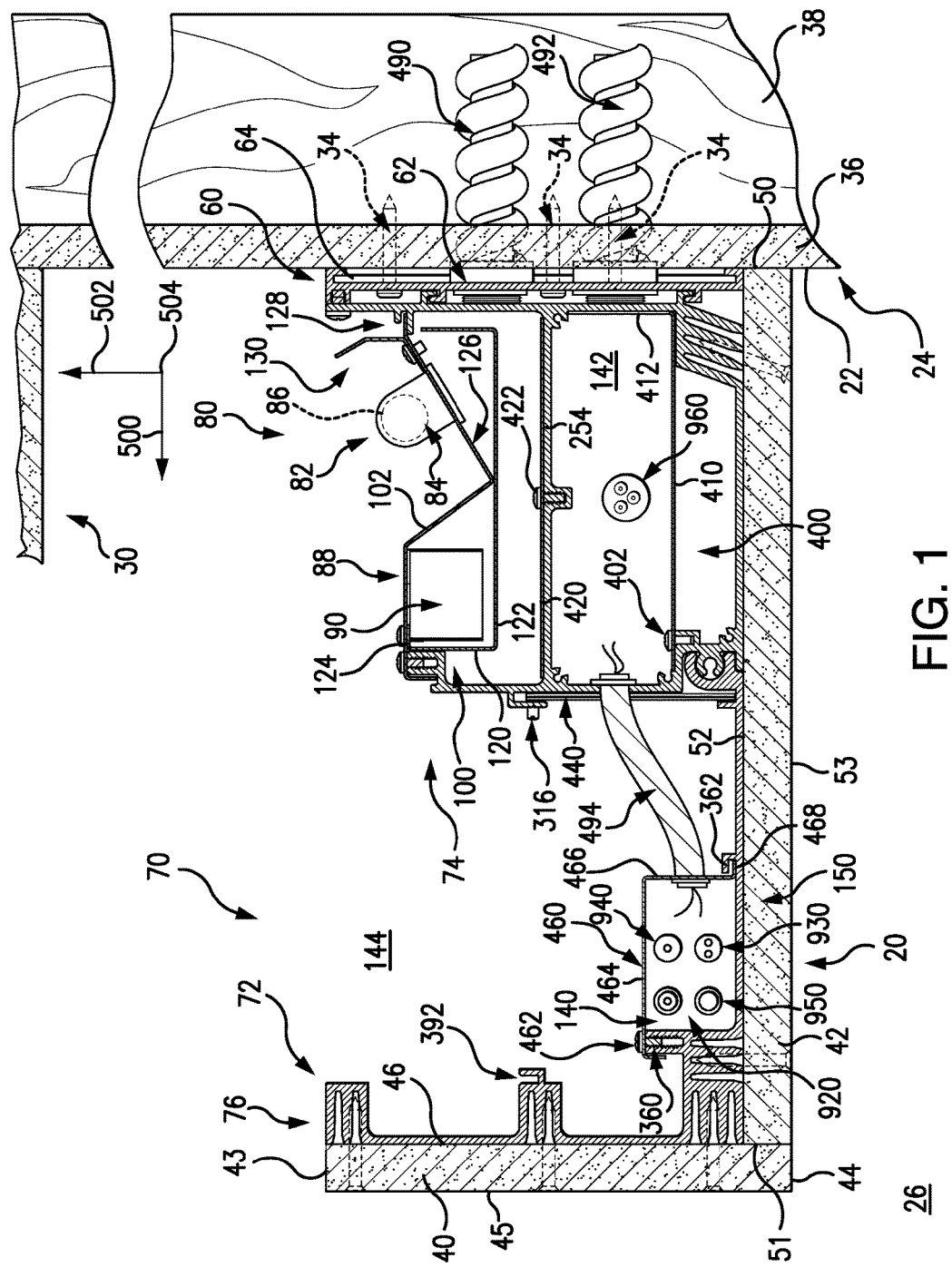
FIG. 1 is a vertical front-to-back sectional view of a lighting fixture.
Figure 2:
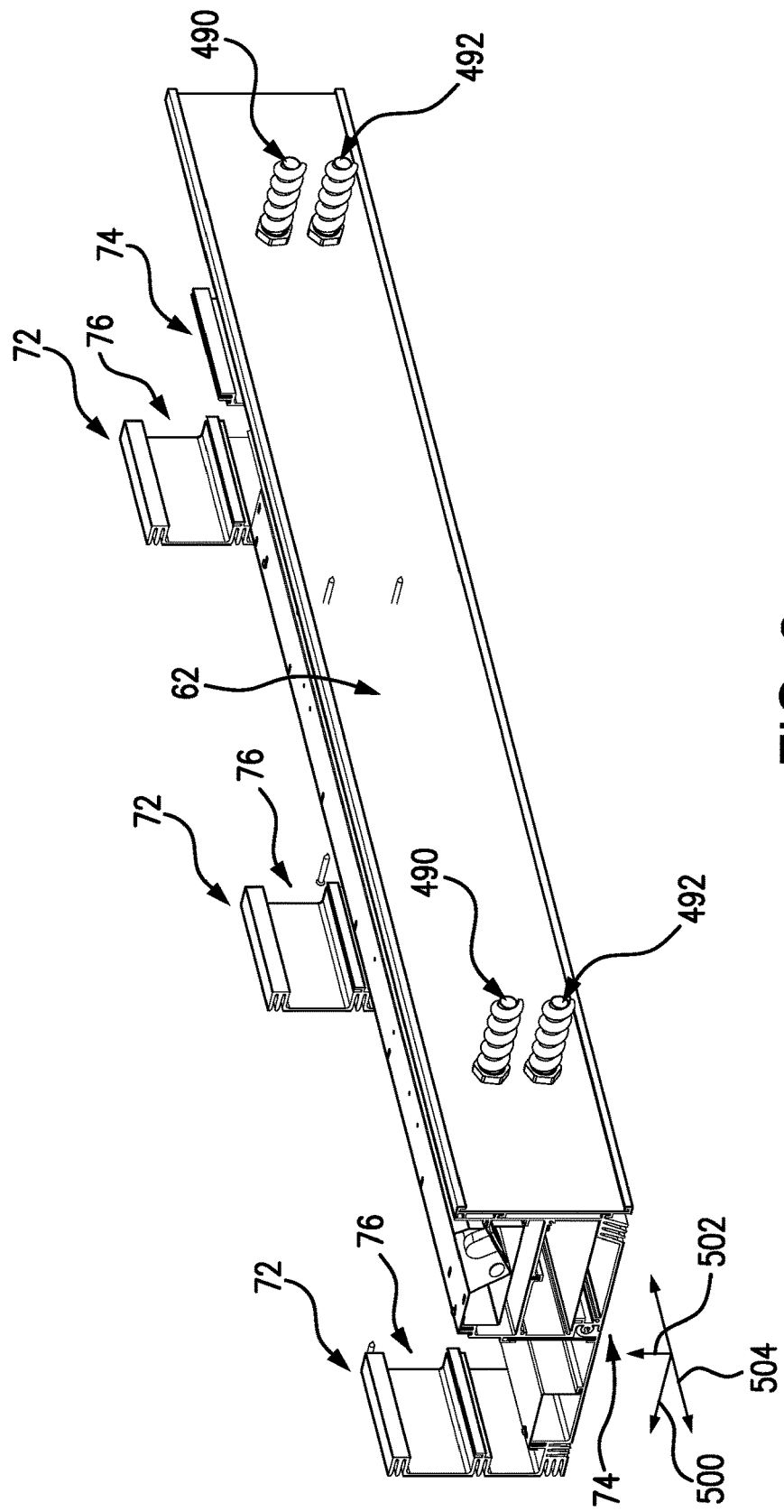
FIG. 2 is a first view of a fixture module of the fixture of FIG. 1.
Figure 3:
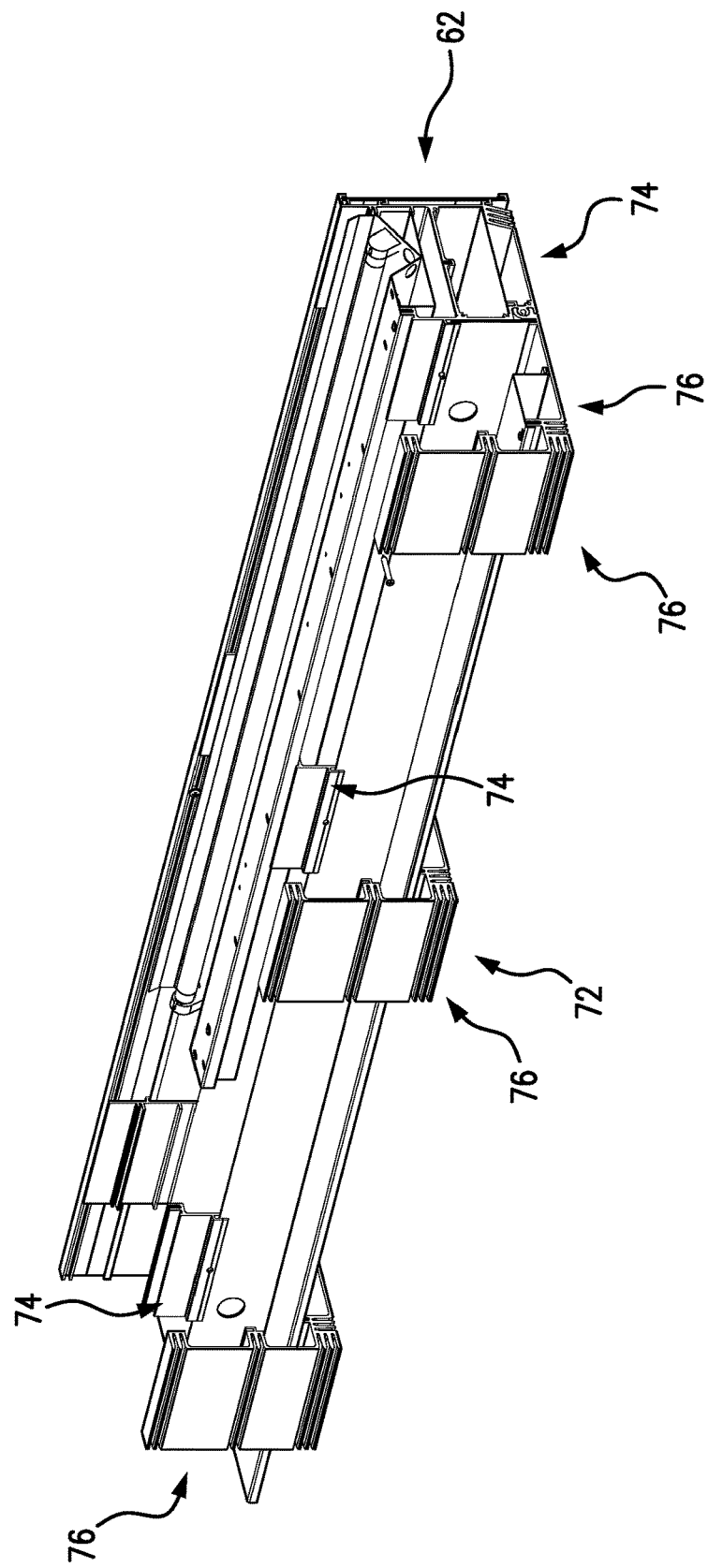
FIG. 3 is a second view of the fixture module.

FIG. 1 shows a light fixture assembly 20 mounted to a surface 22 of a building. The surface may be a surface of a wall 24 of a room 26, a wall of a ceiling cove, a side of a structural beam, or the like. A cove may be above a main portion of the room. The fixture assembly may be positioned adjacent to and slightly below a ceiling or ceiling portion 30. For convenient reference, a forward direction 500 is defined as away from the wall. An upward direction is shown as 502. With left and right defined from the point of view of a person standing upright and facing in the forward direction, the fixture assembly may extend from a left end to a right end. The assembly may include one, two, or more individual fixture units or subsystem units assembled or otherwise arranged end-to-end. This bi-direction 504 of assembly is identified as longitudinal.

The exemplary fixture assembly 20 is shown in an exemplary mounting situation mounted (e.g., screwed 34) directly the wall 24. The exemplary wall comprises wallboard 36 (e.g., gypsum board, plasterboard, or the like) on studs 38 (e.g., dimensional lumber or metallic substitute). Additional wallboard 40 extends as a forward/front trim partially along the front of the fixture. Additional wallboard 42 extends as a lower/bottom trim along the bottom. The wallboard 40 extends from an upper edge 43 to a lower edge 44 and has front 45 and aft 46 surfaces. Similarly, the wallboard 42 extends from a rear edge 50 to a front edge 51 and has upper 52 and lower 53 surfaces. In the longitudinal direction 504, the wallboard 40 and 42 may be represented by multiple end-to-end pieces ultimately secured via conventional techniques.

The assembly 20 may comprise several subsystems. A first exemplary subsystem is a wall-mounting subsystem 60. The exemplary subsystem 60 includes an end-to-end array of mounting members 62 (see also, FIG. 4). Exemplary mounting members 62 are extrusions (e.g., of an aluminum alloy) having a convoluted profile so as to form the gross features shown and described below. Adjacent members 62 are joined by connector plates 64 (e.g., aluminum, steel, or plastic) spanning their junctions. The members 62 may be secured to the wall 24 by the fasteners 34 (e.g., screws, toggle fasteners, or the like). Further structural details of the exemplary subsystem 60 and its members 62 are discussed below.

A second subsystem is a support bracket subsystem 70 that mounts to the wall-mounting system 60 and, in turn, supports other subsystems and components. The bracket subsystem 70 comprises a plurality of brackets 72 spaced laterally apart on the wall-mounting subsystem 60. Each of the exemplary brackets 72 comprises a rear portion formed by a rear piece/member 74 (see also, FIG. 5) and a forward portion formed by a forward piece/member 76 (see also, FIG. 6). Details of these exemplary members are discussed further below. The segmentation into separate pieces 74 and 76 allows ease of manufacture via small extrusion equipment (rather than requiring large extrusion equipment to extrude the brackets 72 as a single piece).

A third subsystem is an electrical subsystem 80 (FIG. 1). The exemplary electrical subsystem includes a light source 82. An exemplary light source may include one or more receptacles 84 mounting/carrying bulbs 86 (e.g., fluorescent tubes) for emitting light. Alternatives include light emitting diode (LED) strips. The receptacles are mounted on and carried by a gear tray 88 which in the exemplary embodiment is attached to the rear piece 74. In FIG. 1, a ballast 90 is shown carried by the tray 88. Receptacle/tray/ballast combinations may be longitudinally arrayed spaced apart end-to-end with a spacing associated with the desired density of light. In several alternative variations, a single ballast may power more than just the adjacent bulb(s). In other variations, there may be more complex interrelationship of the bulbs such as longitudinal staggering of receptacles for conventional tubes to reduce dark spots. Various permutations of known and unknown electrical connections may be used to connect the ballasts to external power (potentially including various daisy chaining of individual units, slaving of individual units, and the like). Additionally, alternative light sources may include light emitting diode (LED) strips or other lighting technologies instead of fluorescent tubes.

As is discussed further below, the exemplary gear tray 88 comprises a lower member 100 and an upper member 102. The lower member 100 serves to enclose the wiring and the connections. The lower member 100 has a forward wall 120 and a lower wall 122 extending aft from a bottom end of the forward wall. The lower member has an upper web 124 extending rearward from an upper edge of the forward wall above the ballast. The upper member 102 extends rearward over the ballast and downward having a portion 126 mounting the receptacles and then terminating in a rear portion 128 mated to the bracket 72 (rear piece 74). The exemplary gear tray includes a reflector 130 mounted to the upper member behind the receptacles.

As is discussed further below, the system may define several passageways 140, 142 for passing various utilities and a compartment 144 (e.g., a forward upwardly-open bay) for accommodating various additional components.

A fourth subsystem is a trim subsystem 150 mounted to the wall-mounting subsystem and blocking the other subsystems from normal view by room occupants. This exemplary trim subsystem includes the forward trim 40 and the lower trim 42. The exemplary wallboard trim members may be screwed to the brackets 72 by screws having threaded shanks captured in channels (discussed below) of the brackets. Various other wallboard artifacts may include tape, skim coats, finish coats, wall paper, and the like. Alternative trim members may comprise wood and/or veneer.

The exemplary pieces 62, 74, and 76 are each extruded of aluminum alloy and cut to length (e.g., 1 inch to 8 inches).

In cross-section, the pieces 62 (FIG. 4) have a vertical web 200 extending from a lower edge 202 to an upper edge 204 and having a front face 206 and a rear face 208. At the upper and lower edges, respective top and bottom, L-shaped portions 210 and 212 form respective channels 214 and 216 facing each other for capturing associated top and bottom edge portions of the plates 64.

Along the front face 206, the web has respective upper and lower shallow grooves 220, 221 for locating the fasteners 34. It also has a pair of L-shaped portions 222 and 223 forming respective channels 224 and 225 facing upward for capturing associated portions of the piece(s) 74 for mounting the brackets 72. At the upper end, the front face bears a pair of forward lips 228 defining a forwardly-open channel 230 (e.g. with grooved walls for engaging threads of a screw (FIG. 1)).

In cross-section, the pieces 74 (FIG. 5) have a vertical rear web 250 (extending between upper and lower edges and having front and rear faces) and a vertical forward web 252 (extending between upper and lower edges and having front and rear faces). These are joined by a transverse web 254 (extending between front and rear ends and having upper and lower faces), A lower web 256 extends aft from a forward edge and terminates in a channel array 260 joining a lower edge of the rear web. The channel array 260 has alternating angled walls 262 and channels 264 angled off vertical to facilitate receipt of the screws securing a rear portion of the lower trim.

Protruding from the rear face of the rear web 250 a pair of L-shaped portions 270 and 271 forming respective channels 272 and 274 facing downward for capturing (or being captured by the L-shaped portions 222 and 223 of the piece 62.

Figures 4, 5:
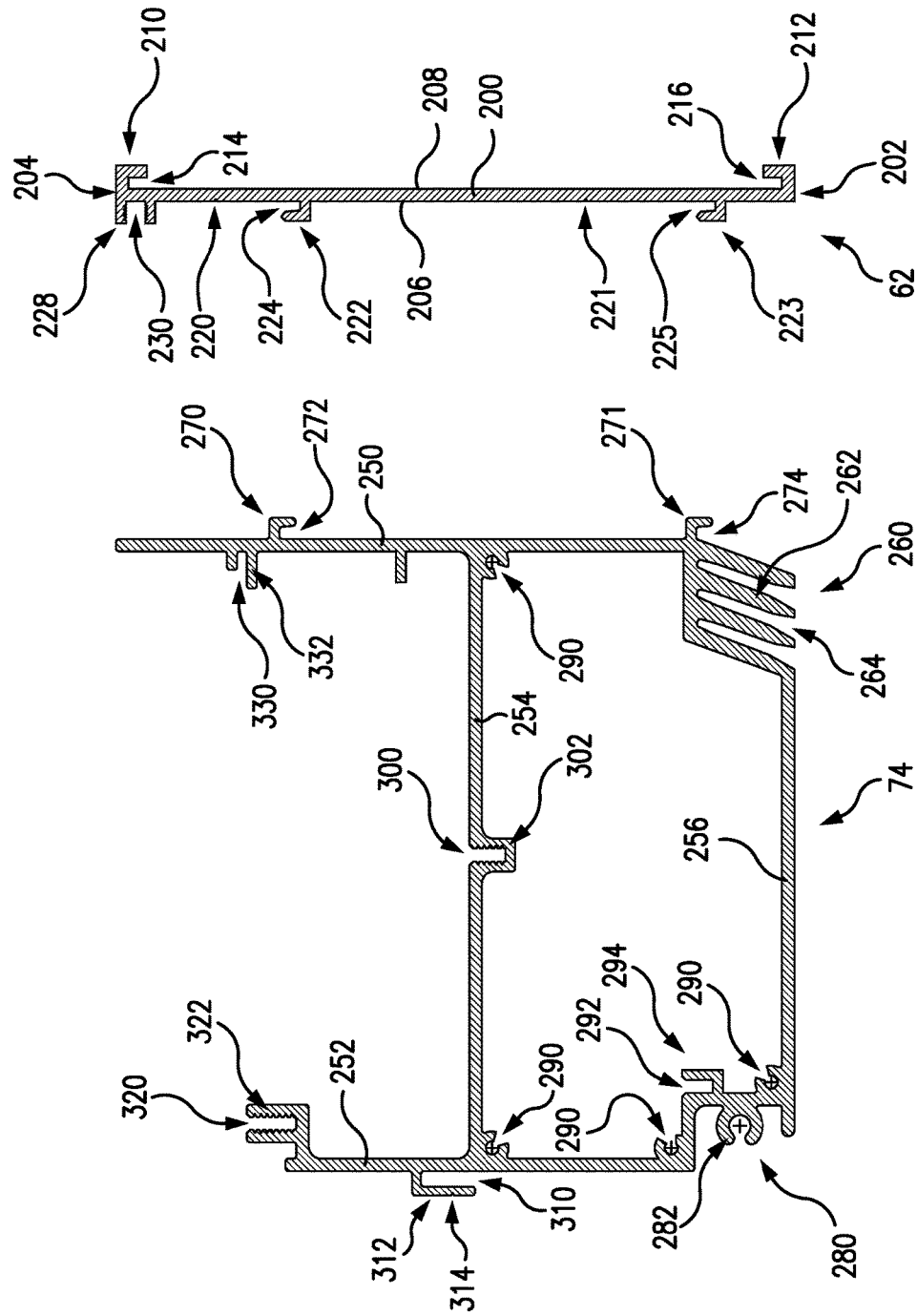
FIG. 4 is a sectional view of a mounting extrusion of the fixture.
FIG. 5 is a sectional view of a rear bracket extrusion of the fixture.

A junction 280 of the forward web 252 and lower wall 256 comprises a feature 282 for mating with a complementary feature of the forward piece 76. FIG. 5 further shows the piece 76 including a plurality of C-shaped features 290 for receiving optional screws (not shown) for attaching an end plate (not shown) at a free end (if any of the fixture).

The exemplary passageway 142 (FIG. 1) is bounded bottom and rear by bent sheetmetal plates 400. Exemplary material for these and other sheetmetal plates discussed below is steel (e.g., galvanized or painted) cut and bent to shape. Adjacent end portions of these plates may nest/overlap. Fasteners (e.g., screws) 402 may extend through holes (round or longitudinally elongate slots) in the plates 400 and into associated upwardly open channels 292 (FIG. 5) formed by portions 294 of the rear bracket portion 74. In this example, the channel 292 is upwardly open at a front of a lower horizontal portion 410 of the plate. The plate has a vertical rear wall 412 extending upward from a bend joining the portion 410.

The exemplary passageway 142 is bounded at the top by sheetmetal plates 420. Adjacent end portions of these plates may overlap. The plates 420 sit atop the web 254. Fasteners (e.g., screws) 422 may extend through holes (round or longitudinally elongate slots) in the plates 420 and into associated upwardly open channels 300 (FIG. 5) formed by portions 302 of the webs 254.

The exemplary passageway 142 is bounded at the front by sheetmetal plates 440 (FIG. 1). Adjacent end portions of these plates may overlap. Upper and lower edge portions of the plates are captured in channels of the brackets. In the illustrated example, the upper edge portions are captured by downwardly open channels 310 (FIG. 5) formed by L-shaped portions 312 along the front face of the front wall 252 of the piece 74. A front surface of a distal leg of the L bears a groove 314 for registering drilling of a pilot hole to accommodate a set screw 316 (FIG. 1). The set screw locks the plate(s) engaged to the piece 74 (e.g., compressing against the wall 252 front face). Loosening of the set screws allows the plates to be slid past each other to open up access to the passageway 142.

FIG. 5 further shows the piece 74 as having an upwardly-open channel 320 formed by a pair of upward walls 322 at the upper end of the wall 252. The exemplary channel has grooved sides for receiving a screw (FIG. 1) mounting a forward portion of the gear tray. FIG. 5 also shows a forwardly open channel 330 formed by lips 332 capturing a rear edge portion 128 (FIG. 1) of the gear tray.

The exemplary front piece 76 (FIG. 6) has a lower horizontal web 350 (extending between front and rear edges and having upper and lower faces) and a vertical forward wall 352 (extending between upper and lower edges and having front and rear faces). At the rear edge or end of the lower web, the front piece 76 bears a feature 354 for engaging the feature 282 in this example, the features 282 and 354 are respective smaller and larger c-sectioned features dimensioned for the feature 282 to closely nest within the larger feature 354. The two features may snap into engagement via compressing or may be laterally slid into engagement. Once engaged, relative rotation of the two pieces is prevented. Exemplary widths of the pieces 74 and 76 is 1 inch to 8 inches. In one example, both are 4-6 inches. They may be of equal widths (lengths when cut from the initial extrusions) or they may be of different widths (e.g., for strength the rear pieces 74 may be wider than the front pieces 76.

The exemplary passageway 140 is bounded top and rear by bent sheetmetal plates 460 (FIG. 1). Adjacent end portions of these plates may nest/overlap. Fasteners (e.g., screws) 462 may extend through holes (round or longitudinally elongate slots) in the plates 460 and into an associated channel 360 of the forward portion 76. In this example, the channel portion 360 is upwardly open at a front of an upper horizontal portion 464 of the plate. The plate has a rear wall 466 ending in a rear foot 468 received in another channel 362 of the bracket forward piece or portion 76.

Thus, the exemplary passageway 140 is bounded along the bottom by the trim 42 and along the front is essentially open to the bay 144 but with the opening spaced behind the trim 40 and thus relatively protected. Thus, if the passageway 140 is used to carry low or no voltage components (e.g., discussed below) this openness is acceptable.

Figure 6:
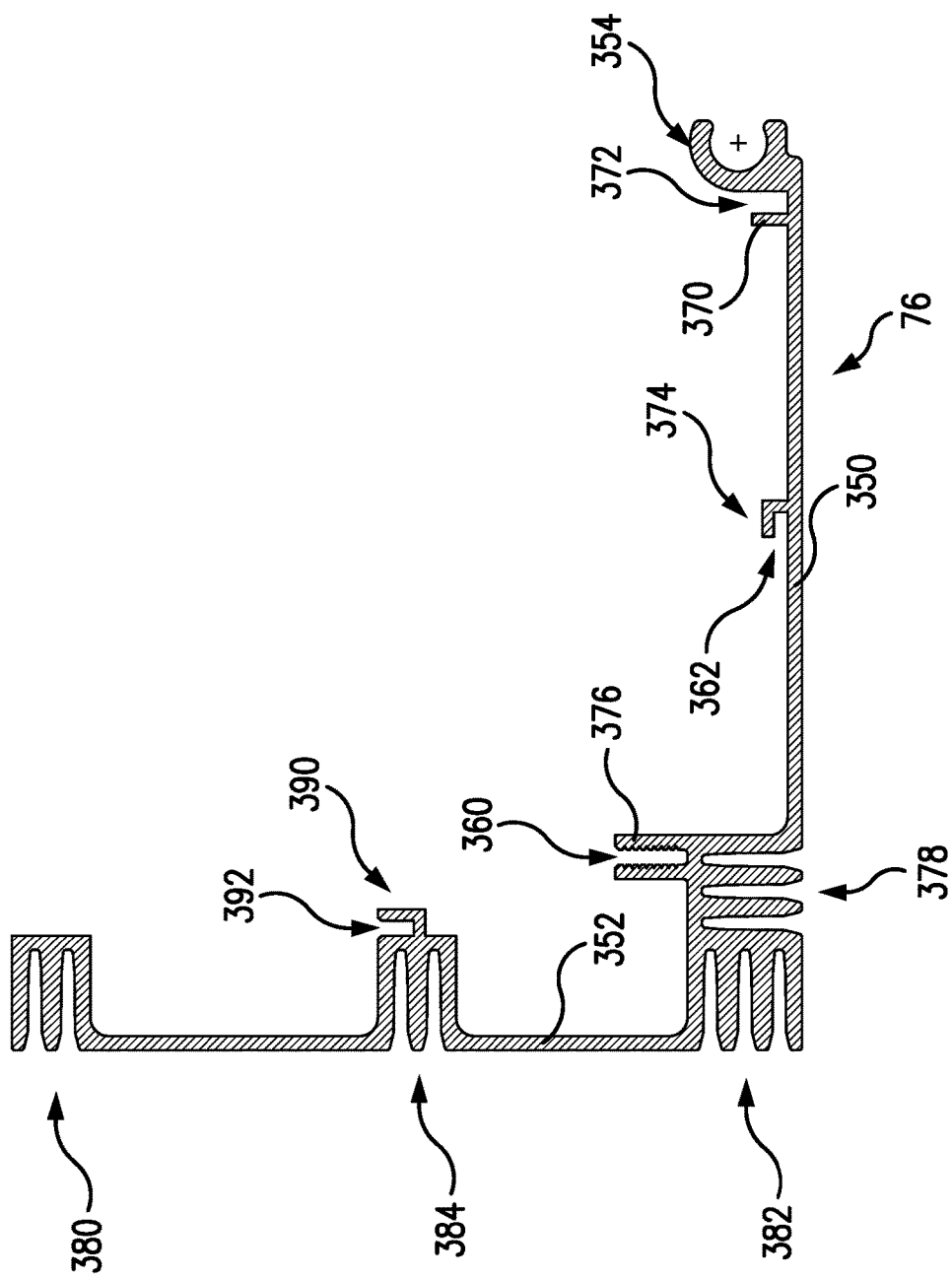
FIG. 6 is a sectional view of a front bracket extrusion of the fixture.

FIG. 6 shows further details of the exemplary extrusion forming the front piece 76. Spaced slightly ahead of the feature 354, a vertical wall or lip 370 extends slightly upward from the web 350 and defines a channel 372. This channel captures the lower edges of the plates 440 of FIG. 1 cooperating with the channel 310 of FIG. 5 opposite thereto and directly above.

FIG. 6 also shows an L-sectioned portion 374 extending upward from the web 350 to cooperate therewith to define a channel 362. FIG. 6 also shows a pair of upwardly-projecting lips 376 forming the channel 360 and being extruded with grooved faces for improved screw engagement. FIG. 6 further shows a lower generally downwardly directed channel and wall array 378 near the front of the piece for receiving screws for fastening the trim 42. Along the forward wall 352, there are upper, lower, and intermediate forwardly open channel and wall arrays 380, 382, and 384 for receiving screws fastening the trim 40. The combination of channel arrays 378 and 372 form a junction between the lower web 350 and the forward wall 352. The forward wall 352 also bears an L-shaped projection 390 defining a channel 392. In this example, the projection 390 extends rearward from a base of the channel/wall array 384. The channel 392 is upwardly open and may receive fasteners (not shown) or other mounting features of equipment mounted in the bay 144 of FIG. 1.

Exemplary utilities passing through the passageways 140 and 142 include low or no voltage components and non-low voltage wiring. Exemplary low voltage components include: communications wiring 920 (FIG. 1, e.g., RF coaxial cable; telephone wiring, network wiring, control wiring such as for cameras and displays, other audio and/or video signals or controls therefor, signal lines for safety detectors (e.g., smoke, fire/heat, and/or carbon monoxide) or security system components, signal wires for lighting control (e.g., dimming) and the like); and low voltage power supply lines or wiring 930 (e.g., for emergency lighting, signage, or powering accessories such as cameras, sensors (e.g., occupancy sensors), and the like). Exemplary non-voltage components include fiber optic lines 940 (e.g., carrying any of the aforementioned signals) and fluid lines or conduits 950 (e.g., delivering fluid for fire suppression or acting as a room air return for HVAC).

An exemplary non-low voltage line in the passageway 142 is a power line 960 not powering the at least one light source of the associated fixture. For example, it could power other lighting fixtures or could otherwise provide power for additional circuits. This may be particularly relevant in a retrofit of an existing building to minimize the number of wiring penetrations of the building walls.

FIG. 1 also show one or more conduits 490 carrying power lines through the pieces 62 to the lights. One or more conduits 492 carry power lines or other lines through the pieces 62 to passageway 142. One or more conduits 494 carry power or other lines between the passageways 140 and 142. Holes for these conduits may be pre-drilled in the various plates and pieces 62.

In yet other variations, additional light sources may be added. For example, downlight sources could be positioned in or below the passageway 142.

Other conventional features may be added. For example, these include corner transitions between linear runs of the fixture, end caps, and the like.

The accessory well (shown above the low/no voltage passageway 140) may contain systems coupled to lines within the low/no voltage passageway. Such system components may include cameras, sensors (e.g., daylight harvesting sensors, occupancy sensors, safety detector sensors such as smoke, fire/heat, and/or carbon monoxide, or climate control sensors such as general temperature sensors or humidity sensors).

For installation, long lengths of the wall mounting members 62 may be screwed to the wall end-to-end joined by the connector plates 64. Exemplary lengths may be three feet or greater, more particularly, six feet to twelve feet. For shorter linear runs (or linear segments of a run having turns) longer members 62 may be cut to length. The members 62 may be cut to length to make up the difference at the end of any longer leg (e.g., a twelve foot leg may be formed by an eight foot piece and another four foot segment cut from an eight foot piece). With these fastened to the wall, the brackets may be installed spaced as desired. Spacing may reflect structural concerns of supporting the weight of the entire finished fixture and may reflect concerns of providing brackets in the correct positions to mount the desired number of gear trays. As noted above, the number of gear trays and the spacing/gap therebetween may be influenced by the desired light intensity. When installing the brackets, the rear pieces 74 may be installed first by a downward translation to mate the respective features of pieces 74 and members 62. If not predrilled for fasteners to engage the channels 230, the holes may then be drilled in the rear pieces. The fasteners may then be secured. Depending upon situation, gear trays, plates, etc. may be added at this point or later. The front pieces may be assembled to the rear pieces. The trim may be installed.

In one exemplary situation where it is desired to do mechanical work first, the installation of the gear trays and wiring or other utilities in the passageways may be performed after mechanical assembly that includes attaching the trim members.

One or more embodiments of the present invention have been described. Nevertheless, it will be understood that various modifications may be made without departing from the spirit and scope of the invention. For example, various elements may be combined or further separated. Additionally, a variety of structural shapes and cooperating features of the extrusion are possible. Various other manufacturing techniques and materials may be used. Multiple bulb and multiple reflector embodiments are also possible. Architectural/design considerations may influence any particular implementation, giving rise to the possibility of mounting on non-vertical surfaces and mounting in non-horizontally extending arrays. Accordingly, other embodiments are within the scope of the following claims.

What is claimed is:

1. A light apparatus mounted to a surface of a building and comprising:
    at least one elongate mounting member engaged to the surface;
    spaced-apart brackets mounted to the at least one elongate mounting member and extending forward therefrom;
    at least one light source mounted to a plurality of the spaced apart brackets;
    a forward trim mounted to the spaced-apart brackets;
    a lower trim mounted to the spaced-apart brackets; and
    a passageway above the lower trim and behind the forward trim and passing at least one of:
        a fluid line;
        an optical fiber;
        a communications line; and
        a power line not powering the at least one light source.

2. The apparatus of claim 1 wherein:
    the surface is a wall;
    the at least one elongate mounting member extends essentially horizontally along the wall; and
    the brackets each comprise:
        a first portion along mounted directly to the at least one elongate mounting member; and
        a second portion extending forward from the first portion and engaging the forward trim.

3. The apparatus of claim 1 wherein:
    the at least one light source comprises a plurality of elongate fluorescent light bulbs or a plurality of LED strips.

4. The apparatus of claim 1 further comprising:
    at least one power line coupled to power the at least one light source.

5. The apparatus of claim 2 wherein:
    each said first portion is in interlocked engagement with an associated said second portion.

6. The apparatus of claim 5 wherein:
    each said first portion is in said interlocked engagement with said associated said second portion via a projection captured in a recess.

7. A light apparatus mounted to a surface of a building and comprising:
    at least one elongate mounting member engaged to the surface;
    spaced-apart brackets mounted to the at least one elongate mounting member and extending forward therefrom;
    at least one light source mounted to a plurality of the spaced apart brackets;
    a forward trim mounted to the spaced-apart brackets;
    a lower trim mounted to the spaced-apart brackets; and
    a passageway passing at least one of:
        a fluid line;
        an optical fiber;
        a communications line; and
        a power line not powering the at least one light source, wherein the brackets comprise:
    an underside having an aft plurality of upwardly extending recesses and a forward plurality of upwardly extending recesses; and
    a front having a lower plurality of rearwardly extending recesses and an upper plurality of rearwardly extending recesses.

8. The apparatus of claim 7 wherein:
    the lower trim comprises a lower wallboard layer screwed to the forward plurality of upwardly extending recesses and the aft plurality of upwardly extending recesses; and
    the forward trim comprises a forward wallboard layer screwed to the forward plurality of upwardly extending recesses and the aft plurality of upwardly extending recesses.

9. The apparatus of claim 8 wherein:
    the lower wallboard layer and the forward wallboard layer each comprise, in majority volume part, cementaceous or fibrous material or combinations thereof.

10. The apparatus of claim 1 wherein:
    the passageway is at least partially bounded by a plurality of sheetmetal members spanning multiple said brackets.

11. The apparatus of claim 10 wherein:
    the passageway is substantially enclosed top, bottom and front by said plurality of sheetmetal members and contains said power line as a non-low voltage power line.

12. The apparatus of claim 10 wherein:
    the passageway is substantially enclosed top and rear but not bottom and front by said plurality of sheetmetal members.

13. The apparatus of claim 10 wherein:
    at least one light source comprise modules mounted directly to the brackets.

14. The apparatus of claim 1 wherein:
    the at least one elongate mounting member an aluminum alloy extrusion; and
    the brackets each comprise one or more aluminum alloy extrusions.

15. The apparatus of claim 1 wherein the at least one light source each comprise:
    a holding element, comprising:
        at least one metal support; and
        at least one receptacle mounted to the support; and
    at least one ballast.

16. A light apparatus comprising:
    at least one light source;
    first means installable to a building wall for mounting a remainder of the apparatus to the wall;
    second means mountable to the first means for mounting the at least one light source and a forward trim member and a lower trim member; and
    third means mounted to the second means for at least partially forming a passageway.

17. The apparatus of claim 16 wherein the passageway passes at least one of:
    a fluid line;
    an optical fiber; and
    a communications line.

18. The apparatus of claim 16 further comprising said forward trim member and said lower trim member comprising wallboard.

19. A light apparatus mounted to a surface of a building and comprising:

at least one elongate mounting member engaged to the surface;

spaced-apart brackets mounted to the at least one elongate mounting member and extending forward therefrom;

at least one light source mounted to a plurality of the spaced apart brackets;

a forward wallboard trim mounted to the spaced-apart brackets;

a lower wallboard trim mounted to the spaced-apart brackets; and a passageway passing at least one of:
 a fluid line;
 an optical fiber;
 a communications line; and
 a power line not powering the at least one light source and of a lower voltage than a power line powering the at least one light source.

20. The apparatus of claim 19 wherein the passageway passes at least one of:
 the fluid line;
 the optical fiber; and
 the communications line.

\* \* \* \* \*